L. CHURCH.
INDICATOR.
APPLICATION FILED JULY 16, 1913.
1,139,489.
Patented May 18, 1915.
2 SHEETS—SHEET 2.
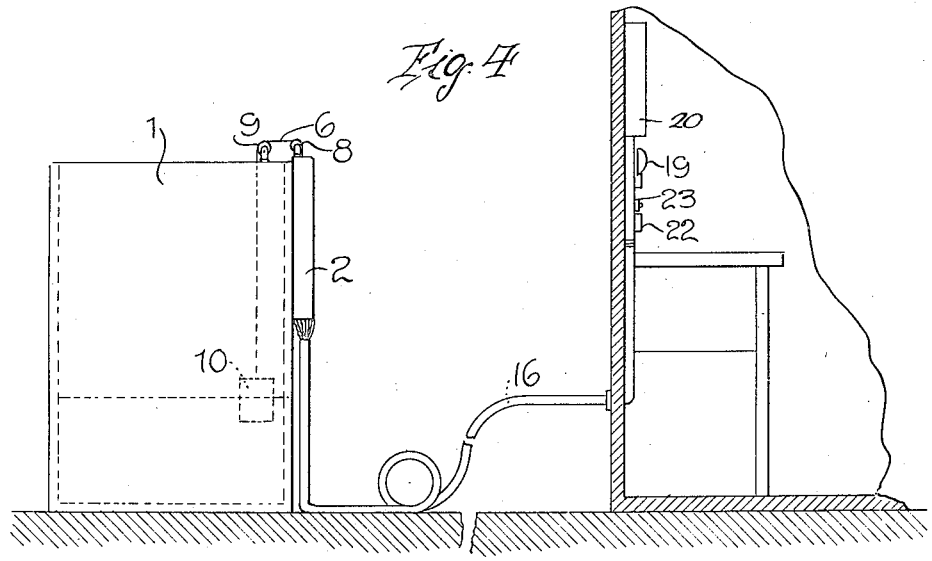
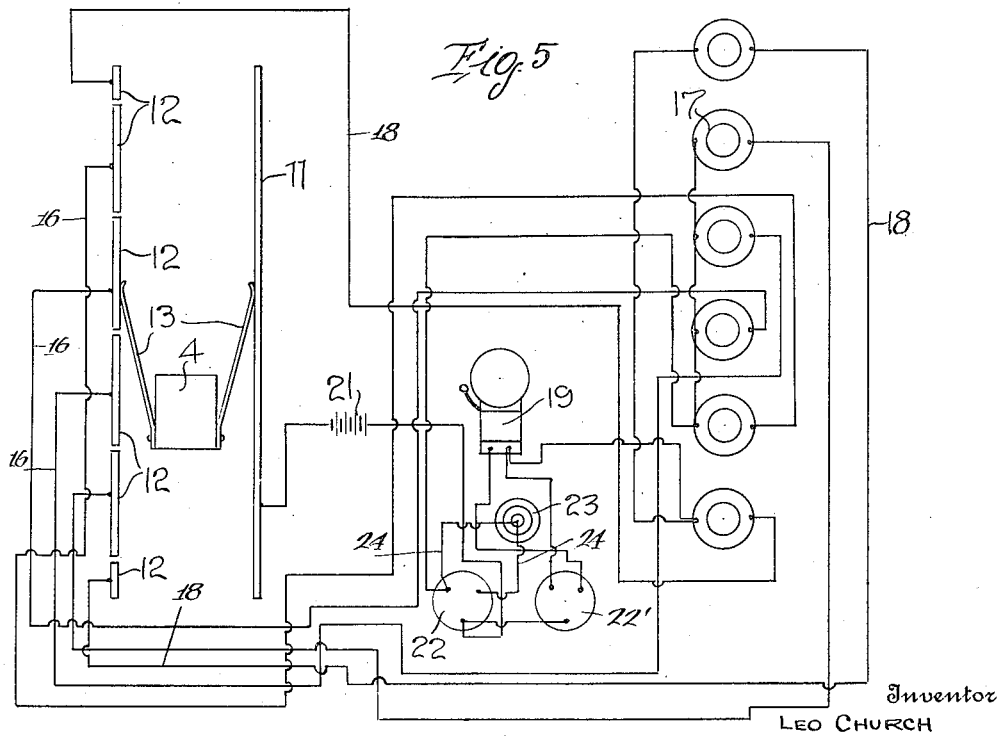

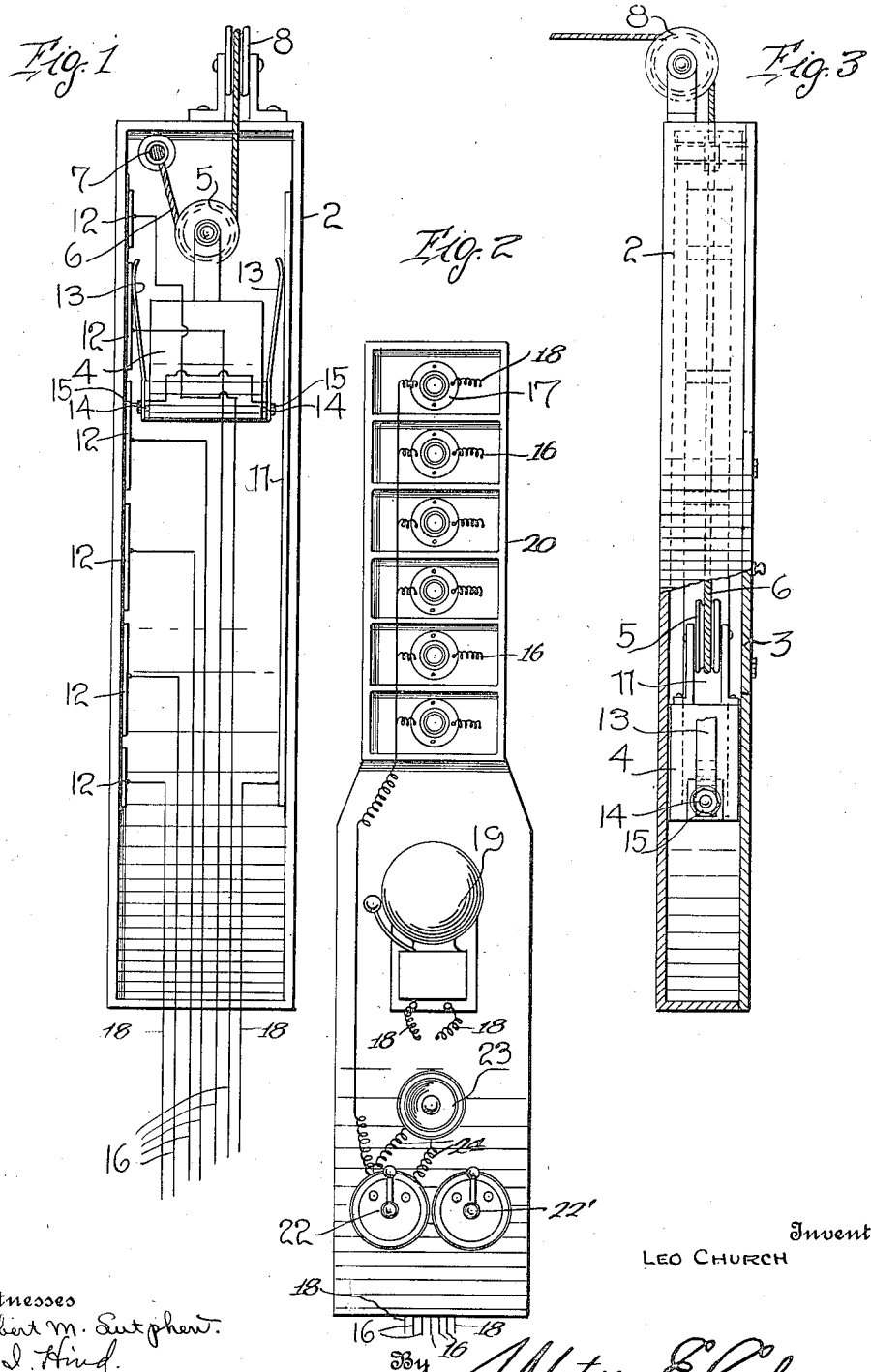

UNITED STATES PATENT OFFICE.

LEO CHURCH, OF MOBRIDGE, SOUTH DAKOTA.

INDICATOR.

1,139,489.

Specification of Letters Patent.

Patented May 18, 1915.

Application filed July 16, 1913. Serial No. 779,376.

*To all whom it may concern:*

Be it known that I, LEO CHURCH, a citizen of the United States, residing at Mobridge, in the county of Walworth and State of South Dakota, have invented certain new and useful Improvements in Indicators, of which the following is a specification, reference being had to the accompanying drawings.

This invention relates to new and useful improvements in indicators and more particularly to electrical indicators, and the object of the present invention resides in the provision of an electric indicator which is especially adapted for use upon water tanks and more particularly to water tanks used by the various railroads in supplying the locomotives with water, and is particularly adapted for indicating the various depths of the water within the tank, and at the same time is provided with a signal whereby the operator may readily be notified should the tank become emptied or filled to a point nearly to the overflowing.

Another object of the invention is the provision of an electric indicating device for tanks which will possess advantages in points of efficiency and durability, is inexpensive of manufacture and at the same time is simple in construction and operation.

With the above and other objects in view, as will appear as the nature of the invention is better understood, the same consists in an indicating device for water tanks comprising, generally, two parts, namely a contact box which is applied to the water receptacle or tank and an indicator which is placed in the pump station or wherever most convenient, and indicates the level of the water in feet from the bottom of the tank, mechanism being provided whereby a bell will be rung when the water gets below a certain point or above another point, thus notifying the attendant at the pump that the water must be either shut off or started, according as the water in the tank is low or high. The contact box in part embodies a weight, preferably of lead, to which is attached one end of a cord, the other end of which connects with a float in the tank that is moved up and down as the level of the water varies. Arranged in the indicator is a series of electric lamps, and combined with the indicator are two two-point switches, and a bell constituting the high and low water alarm, and arranged within the contact box, on one side thereof, is a continuous metallic contact, which is of substantially the same length as the box, and on the other side of the box are disposed a series of spaced contacts, and these contacts are designed to be engaged by spring contacts carried by the weight. Combined with the indicator is a push button switch which is designed to be used only when it is desired to read the indicator to ascertain the level of the water in the tank, the push button, bell and lamps being connected with a suitable source of electrical energy, in the present instance a battery.

Combined with each of the spaced contacts is the end of a battery constituting one branch of a circuit in each of which is included an electric lamp, the high and low water indicators including, further, an electric alarm bell, as above pointed out. The contact maker, consisting of the weight and spring contact arms, simply moves up and down in the contact box and closes one or the other of the separate electric circuits by making connection between the continuous brass contact on one side of the contact box and one of the spaced contact plates on the other side, while lighting one of the lamps, the number of which shows the depth of water in the tank. When the connection is made with the top and bottom contact in the box, the bell rings in addition to lighting a lamp on circuit therewith. One of the contact points of one of the two-point switches is used for cutting out the push button, which latter is used in case batteries are employed as the source of electrical energy, as a constantly closed circuit would exhaust the batteries in a short time. Hence, the button is used only to close the circuit momentarily to secure a reading whenever necessary or desirable. The high and low water indicators work independently of the push button, thus giving the alarm in case of high or low water. The other contact point of the same two-point switch is employed for maintaining a closed circuit and having one of the lamps lighted constantly, and is used only when an inexhaustible source of current is available, such as an electric light current. The other two-point switch is for cutting out the electric bell and leaving the lamp lighted, or for cutting out both.

The invention consists further in the various novel features of construction and the combination and arrangement of parts to be hereinafter more fully described, pointed out in the claims and shown in the accompanying drawings, in which—

Figure 1 is a front elevation of the casing which is secured to the tank; Fig. 2 is a front elevation of the supporting member which supports the lights and the signal bell; Fig. 3 is a side elevation of the casing, parts being broken away and in section; Fig. 4 is a diagrammatic view; Fig. 5 is a similar view illustrating the electrical connections.

Referring more particularly to the accompanying drawings 1 Fig. 4 indicates the body of the water tank to which my improved electrical indicator is applied. As herein described and illustrated in the accompanying drawings, a casing 2 is provided which is mounted upon one side of the tank at the top thereof and which is provided at one side with a suitable door 3 whereby access may be readily gained to the interior of the casing. Movably mounted within the casing is a weight 4 having secured to its upper end a suitable pulley 5 around which extends a rope 6, one end of which is rigidly secured in the casing, as indicated at 7, while the other end thereof passes upwardly and over the pulleys 8 and 9, thence downwardly into the tank and secured to its lower end is a float 10. From this it will be seen that upon the rise and fall of the float 10, the weight 4 will move from the top to the bottom of the casing and also from the bottom to the top thereof.

Arranged within the casing and secured to one of the side walls thereof is a continuous contact plate 11 and arranged upon the opposite side wall are a plurality of alined contact plates 12. These contacts are adapted to be engaged by spring contacts 13, the inner ends of which are mounted upon the bolts 14, and secured thereto by means of the nuts 15. The contact plates 12 are preferably arranged for engagement by means of one of the spring contacts 13 and are suitably connected by means of the circuit wires 16 to a series of lights 17. The upper and lower contact plates are adapted for engagement by the spring contacts 13 and are suitably connected by means of the wires 18 to a bell 19. The bell is preferably arranged within the station house or other place where the pump is located so as to readily convey the fact to the operator that the tank is either nearly emptied or full of water. It is preferably desired that the lights 17 be suitably mounted upon a vertically disposed board or holder 20 and inclosed in a glass case, not shown. The lights 17 are each supposed to represent a different height of the water within the tank and, as clearly shown in the accompanying drawings, the lower light indicates that two feet of water is in the tank and as each light is lighted, it will indicate the various depths of the water within the tank. Upon this base board upon which the lights are mounted, I provide the bell 19. The battery 21 is provided in the present instance and is connected to the switch members 22 and 22' and to the continuous contact 11. It will be readily understood that in place of the battery, the connecting wires may be suitably connected up with any source of current. In the drawings, I have illustrated two rotary switches, one connected with the bell and one with the lights 17 and in this arrangement it will be seen that the current to either the bell or the lights may be readily shut off or turned on. A push button 23 is provided which is suitably connected by means of the wires 24 to the contacts of the switch 22 which is connected with the lights whereby when pressure is exerted upon the button 23, the lights may be readily lighted. This button is preferably used when the circuits connected to batteries and the switch 22 are thrown so that the lights will not be lighted all the time which in due time would exhaust the batteries. The button is connected to the circuit of the lights and is pressed only when it is desired to find out how much water is in the tank. the circuit is only completed through the contact engaged by the spring contacts 13 carried by the weight, thus if the water is low in the tank, the lowermost light will be lighted and so on according to the height of the water in the tank. The switch 22' is adapted for use in cutting out the electric bell and leaving the light lighted, or for cutting out both.

In the practical operation of my device, starting with an empty tank, the weight 4 will be at the upper end of the casing 2 and as the water fills into the tank, the weight 4 is lowered through the rise of the float 10 and as the weight 4 drops toward the bottom of the casing, each consecutive light is lighted one at a time so that the operator or other person may be readily notified of the depth of the water in the tank. Should the weight 4 reach the bottom of the casing, the spring contacts 13 will engage with the lowermost contact in the casing, which is connected with the bell 19, thus ringing the bell and notifying the operator that the tank is full so that he may readily cut off the supply of water.

It will be readily apparent that my device is particularly adapted for use upon supply tanks on railroads wherein the tanks are generally supplied with water by means of a pump located some distance from the tank, the casing and the weight being attached to the tank at one side thereof while the lights and the bell may be arranged in the pump house so that the operator which is generally stationed in the pump house, may be readily notified of the condition of the water within the tank.

From the above it will be seen that my device is extremely simple in construction, can be manufactured at comparatively low cost and quickly and readily applied to any suitable form of water tank.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A device of the class described including a casing, a continuous contact arranged in one side of the casing, a series of spaced contacts arranged in the opposite side of the casing, a movable weight within the casing, resilient spring contacts secured to each side of the weight and adapted for engagement with the contacts in the casing, a series of lights and a bell, a battery wires connecting the lights and the spaced contacts, wires connecting the bell with the continuous contact, and switch members arranged between the bell and the battery and between the lights and the battery, as and for the purpose set forth.

In testimony whereof I hereunto affix my signature in the presence of two witnesses.

LEO CHURCH.

Witnesses:
R. E. HOLLEY,
CLAUD BARNES.